(12) United States Patent
Liu

(10) Patent No.: US 12,435,710 B1
(45) Date of Patent: Oct. 7, 2025

(54) WATER PUMP STRUCTURE AND ORAL IRRIGATOR

(71) Applicant: Fly Cat Electrical Co., Ltd., Shenzhen (CN)

(72) Inventor: Xiao Liu, Shenzhen (CN)

(73) Assignee: Fly Cat Electrical Co., Ltd., Shenzhen (CN)

( * ) Notice: Subject to any disclaimer, the term of this patent is extended or adjusted under 35 U.S.C. 154(b) by 0 days.

(21) Appl. No.: 18/782,689

(22) Filed: Jul. 24, 2024

(51) Int. Cl.
*F04B 9/04* (2006.01)
*A61C 17/02* (2006.01)

(52) U.S. Cl.
CPC ............. *F04B 9/042* (2013.01); *F04B 9/047* (2013.01); *A61C 17/02* (2013.01)

(58) Field of Classification Search
CPC .. F04B 9/04; F04B 9/042; F04B 9/045; F04B 9/046; F04B 9/047; F16H 25/14; A61C 1/0092; A61C 17/02
USPC ........................................................ 74/55, 56
See application file for complete search history.

(56) References Cited

U.S. PATENT DOCUMENTS

| 2007/0264139 A1* | 11/2007 | Chou ..................... F04B 35/04 |
| | | 417/415 |
| 2019/0201175 A1* | 7/2019 | Li ......................... A61C 17/032 |
| 2020/0224820 A1* | 7/2020 | Koeppel ............. F04B 27/0895 |

* cited by examiner

Primary Examiner — Kenneth J Hansen
(74) Attorney, Agent, or Firm — Koivula & Somersalo, LLC

(57) ABSTRACT

A water pump structure and an oral irrigator are provided. The water pump structure includes a pump body; a sleeve partially in the pump body and having a movable cavity; a piston assembly including a piston and a connecting member having one end connected thereto; and a driving assembly including a seat body, a connecting rod having a sliding groove and connected to the other end of the connecting member, a cam rotatably provided in the connecting rod and having one end fixed on the seat body, and a driving member having an output end passing through and fixed to the seat body. The piston is in sliding fit with the movable cavity's inner wall; the cam's end, away from the seat body, is provided with a protrusion in sliding fit with an inner wall of the sliding groove whose opening direction is same as the piston's moving direction.

18 Claims, 5 Drawing Sheets

WATER PUMP STRUCTURE AND ORAL IRRIGATOR

CROSS-REFERENCE TO RELATED APPLICATIONS

The present disclosure claims the priority to the Chinese patent application with the filing No. 2024106855187 filed on May 29, 2024 with the Chinese Patent Office and entitled "WATER PUMP STRUCTURE AND ORAL IRRIGATOR", the contents of which are incorporated herein by reference in entirety.

TECHNICAL FIELD

The present disclosure relates to the technical field of oral cleaning devices, and particularly to a water pump structure and an oral irrigator.

BACKGROUND ART

Oral irrigators are auxiliary tools for cleaning oral cavity, and can clean teeth and gaps between teeth by means of flushing with a pulsed water flow.

At present, a water pump structure of existing oral irrigators usually adopts a gear-driving structure to drive a piston to make reciprocating motion, but the gear-driving structure has a problem of loud noise during operation, which further influences user's use experience.

SUMMARY

In order to overcome the defects in the prior art, the present disclosure provides a water pump structure and an oral irrigator.

The present disclosure provides the following technical solutions.

In the first aspect, the present disclosure provides a water pump structure, wherein the water pump structure includes:
- a pump body;
- a sleeve, wherein at least a part of the sleeve is provided in the pump body, and the sleeve has a movable cavity therein;
- a piston assembly, wherein the piston assembly includes a piston and a connecting member, and wherein an end of the connecting member is connected to the piston, and the piston is provided in the movable cavity and is in sliding fit with an inner wall of the movable cavity; and
- a driving assembly, wherein the driving assembly includes a seat body, a cam, a connecting rod and a driving member, and wherein an end of the cam is fixed on the seat body, and the cam is rotatably provided in the connecting rod; the connecting rod is provided with a sliding groove, an end of the cam away from the seat body is provided with a protrusion which is in sliding fit with an inner wall of the sliding groove; the connecting rod is connected to an end of the connecting member away from the piston; an output end of the driving member is provided to pass through the seat body and is fixedly connected to the seat body; and
an opening direction of the sliding groove is the same as a moving direction of the piston in the movable cavity, wherein when the output end drives the seat body to rotate, the cam rotating in the connecting rod can drive the connecting rod to make reciprocating motion.

In a possible embodiment, the driving assembly further includes a fixing element; the seat body is provided with a fixing hole and a connecting hole respectively, the fixing hole communicating with the connecting hole; the output end is disposed in the connecting hole; the fixing element is fixed in the fixing hole, and an end of the fixing element abuts against the output end.

In a possible embodiment, the output end is provided with an abutment surface, and an end of the fixing element abuts against the abutment surface.

In a possible embodiment, the driving assembly further includes a blocking element, wherein the blocking element blocks an opening of the fixing hole, and an end of the fixing element away from the output end abuts against the blocking element.

In a possible embodiment, an outer surface of the fixing element is provided with an external thread, and an inner wall of the fixing hole is provided with an internal thread corresponding to the external thread; and the fixing element is in threaded fit with the inner wall of the fixing hole.

In a possible embodiment, the connecting member has a first connecting end and a second connecting end opposite to each other, wherein the first connecting end is connected to the piston, and the second connecting end is connected to the connecting rod.

In a possible embodiment, the second connecting end and the connecting rod are integrally formed.

In a possible embodiment, the connecting rod is provided with a first chamber, and the second connecting end is engaged in the first chamber.

In a possible embodiment, an axis of the output end and an axis of the protrusion are co-linearly arranged.

In the second aspect, the present disclosure further provides an oral irrigator, including the above water pump structure.

Compared with the prior art, the present disclosure has the following beneficial effects.

For the water pump structure provided in the present disclosure, the output end of the driving member can drive the seat body to rotate, so as to make the seat body drive the cam to rotate in the connecting rod, and further make the cam drive the connecting rod to make reciprocating motion. When making the reciprocating motion, the connecting rod can drive through the connecting member the piston to make the reciprocating motion in the movable cavity. Moreover, when the connecting rod makes the reciprocating motion, cooperation between the protrusion on the cam and the inner wall of the sliding groove of the connecting rod can limit a moving direction of the connecting rod. As the opening direction of the sliding groove is the same as the moving direction of the piston in the movable cavity, collision of the piston with the inner wall of the movable cavity can be effectively reduced, and thus abnormal noise is reduced. The mode in which the water pump structure drives the piston to move in the present embodiment, compared with the mode in which gear transmission (driving) is adopted in the prior art, can effectively reduce the noise generated during operation.

In order to make the above objectives, features and advantages of the present disclosure more obvious and understandable, preferred embodiments are particularly described in detail below with reference to drawings.

BRIEF DESCRIPTION OF DRAWINGS

In order to more clearly illustrate technical solutions of embodiments of the present disclosure, drawings which need to be used in the embodiments will be briefly introduced below. It should be understood that the drawings merely show some embodiments of the present disclosure, and thus should not be considered as limitation to the scope. Those ordinarily skilled in the art still could obtain other relevant drawings according to these drawings, without using any inventive efforts.

DESCRIPTION OF SYMBOLS OF MAIN ELEMENTS

Figure 1:
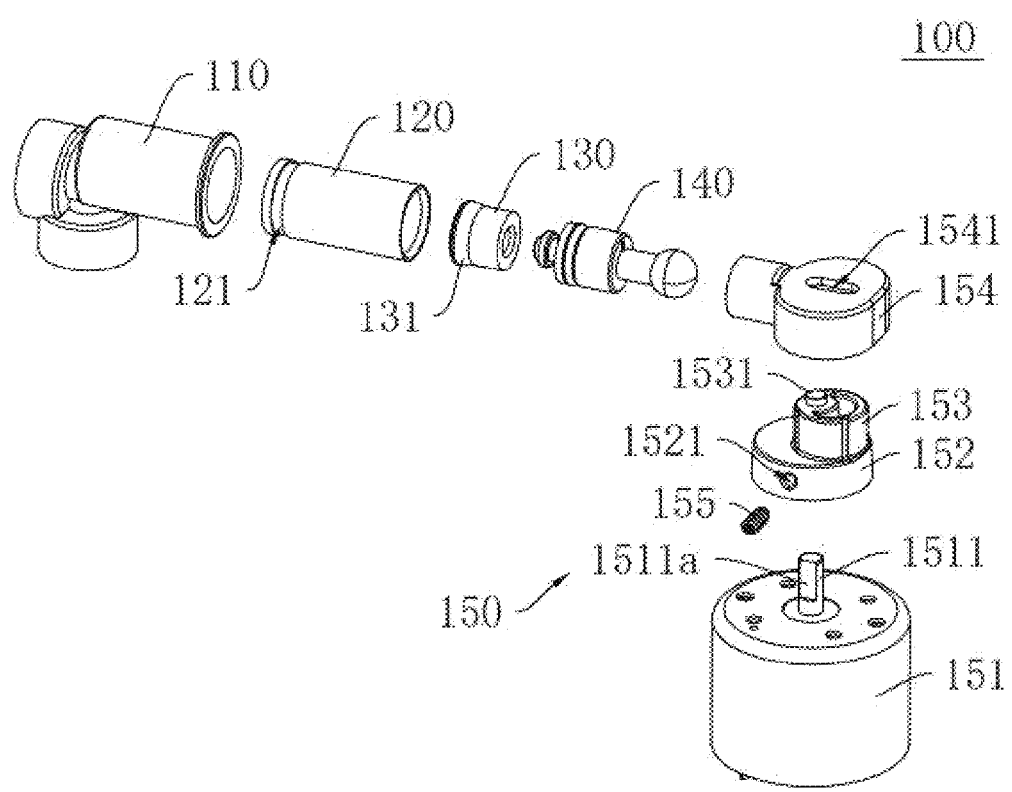
FIG. 1 shows an exploded schematic view of a water pump structure according to an embodiment of the present disclosure.

100—water pump structure; 110—pump body; 120—sleeve; 121—fixing groove; 130—piston; 131—ptrotruded portion; 140—connecting member; 141—body; 142—first connecting end; 1421—first connecting portion; 1422—second connecting portion; 1423—third connecting portion; 143—second connecting end; 144—sealing element; 150—driving assembly; 151—driving member; 1511—output end; 1511a—abutment surface; 152—seat body; 1521—fixing hole; 153—cam; 1531—protrusion; 1532—functional groove; 154—connecting rod; 1541—sliding groove; 1542—first chamber; 1543—second chamber; 155—fixing element.

DETAILED DESCRIPTION OF EMBODIMENTS

The embodiments of the present disclosure are described in detail below, and examples of the embodiments are shown in the drawings, wherein like or similar reference signs represent like or similar elements or elements having like or similar functions throughout. The embodiments described below with reference to the drawings are illustrative, merely for explaining the present disclosure, but should not be construed as limitation to the present disclosure.

In the description of the present disclosure, it should be understood that orientation or positional relationships indicated by the terms such as "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", and "circumferential" are based on orientation or positional relationships shown in the drawings and are merely intended to facilitate describing the present disclosure and simplifying the description, rather than indicating or implying that the indicated device or element must have a particular orientation or be constructed and operated in a specific orientation, and thus cannot be construed as limitation to the present disclosure.

Besides, the terms "first" and "second" are merely used for descriptive purpose, but should not be construed as indicating or implying importance in the relativity or implicitly indicating the number of an indicated technical feature. Thus, defining a feature with "first" or "second" may explicitly or implicitly mean that one or more such features are included. In the description of the present disclosure, "a plurality of" means two or more unless specifically defined otherwise.

In the present disclosure, unless explicitly specified and defined otherwise, the terms such as "mount", "link", "connect", and "fix" should be construed in a broad sense. For example, it may be a fixed connection, a detachable connection, or an integral connection; it may be a mechanical connection, and also may be an electrical connection; it may be direct linking, indirect linking through an intermediary, or internal communication between two elements or interaction relationship between two elements. Specific meanings of the above terms in the present disclosure could be understood by those ordinarily skilled in the art according to specific situations.

In the present disclosure, unless otherwise explicitly specified and defined, a first feature being "on" or "under" a second feature may mean that the first feature is in direct contact with the second feature, or the first feature is in indirect contact with the second feature via an intermediary. Furthermore, the expression the first feature being "over", "above" and "on top of" the second feature may be the case that the first feature is directly above or obliquely above the second feature, or only means that the level of the first feature is higher than that of the second feature. The expression the first feature being "below", "underneath" or "under" the second feature may be the case that the first feature is directly underneath or obliquely underneath the second feature, or only means that the level of the first feature is lower than that of the second feature.

First Embodiment

Figure 2:
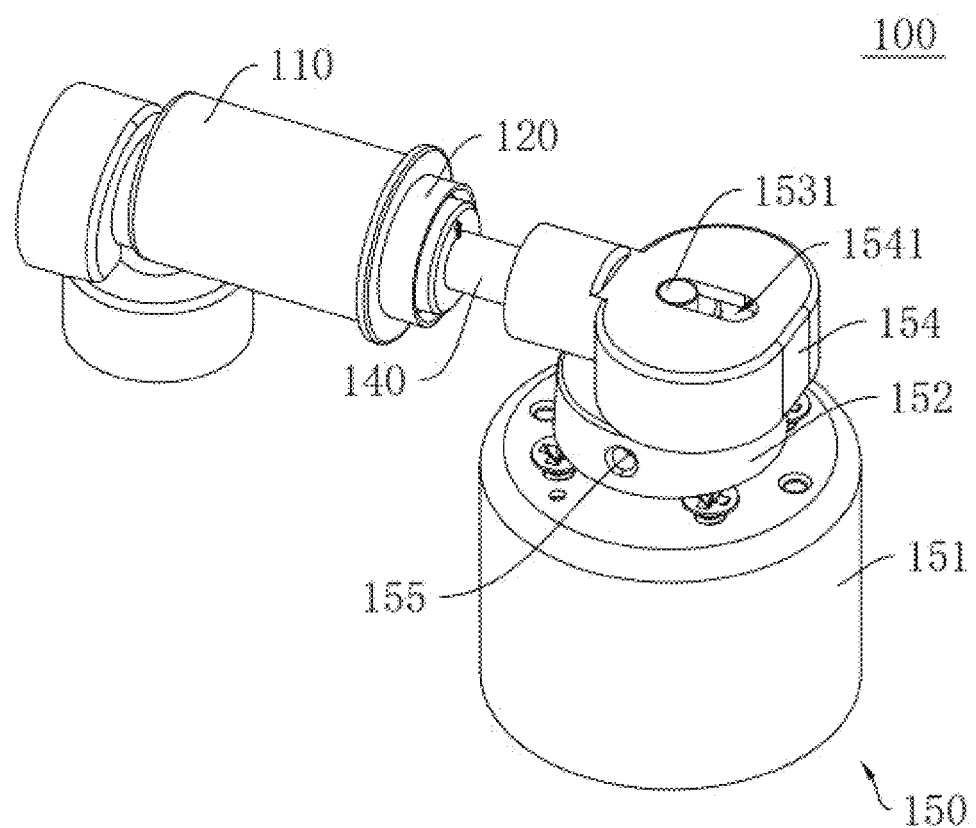
FIG. 2 shows a perspective structural schematic view of a water pump structure according to an embodiment of the present disclosure.

Referring to FIG. 1 and FIG. 2, an embodiment of the present disclosure provides a water pump structure 100. The water pump structure 100 is used in an oral irrigator.

Referring to FIG. 1, the water pump structure 100 includes a pump body 110, a sleeve 120, a piston assembly and a driving assembly 150.

In the above, the pump body 110 is connected to a water tank of the oral irrigator; at least a part of the sleeve 120 is provided in the pump body 110, and the sleeve 120 has a movable cavity therein.

The piston assembly includes a piston 130 and a connecting member 140, wherein an end of the connecting member 140 is connected to the piston 130, and the piston 130 is provided in the movable cavity and is in sliding fit with an inner wall of the movable cavity.

The connecting member 140 can drive the piston 130 to make reciprocating motion in the movable cavity, so as to draw a liquid in the water tank of the oral irrigator through the pump body 110.

The driving assembly 150 includes a seat body 152, a cam 153, a connecting rod 154 and a driving member 151, wherein an end of the cam 153 is fixed on the seat body 152, and the cam 153 is rotatably provided in the connecting rod 154; the connecting rod 154 is connected to an end of the connecting member 140 away from the piston 130; an output end 1511 of the driving member 151 is provided to pass through the seat body 152 and is fixedly connected to the seat body 152.

The output end 1511 of the driving member 151 can drive the seat body 152 to rotate, so as to make the seat body 152 drive the cam 153 to rotate in the connecting rod 154, and further make the cam 153 drive the connecting rod 154 to make reciprocating motion. When making the reciprocating motion, the connecting rod 154 can drive the piston 130 to make the reciprocating motion in the movable cavity through the connecting member 140.

The connecting rod 154 is provided with a sliding groove 1541, and an end of the cam 153 away from the seat body 152 is provided with a protrusion 1531 which is in sliding fit with an inner wall of the sliding groove 1541. An opening direction of the sliding groove 1541 is the same as a moving direction of the piston 130 in the movable cavity.

When the connecting rod 154 makes the reciprocating motion, cooperation between the protrusion 1531 and the inner wall of the sliding groove 1541 can limit a moving direction of the connecting rod 154. As the opening direction of the sliding groove 1541 is the same as the moving direction of the piston 130 in the movable cavity, collision of the piston 130 with the inner wall of the movable cavity can be effectively reduced, and thus abnormal noise is reduced.

The mode in which the water pump structure 100 drives the piston 130 to make reciprocating motion in the present embodiment, compared with the mode in which gear transmission is adopted in the prior art, can effectively reduce the noise generated during operation.

The noise generated during the operation of the gear transmission mainly originates from sound generated in gear meshing.

In some embodiments, the seat body 152 and the cam 153 are fixedly connected by means of integral forming.

Figure 3:
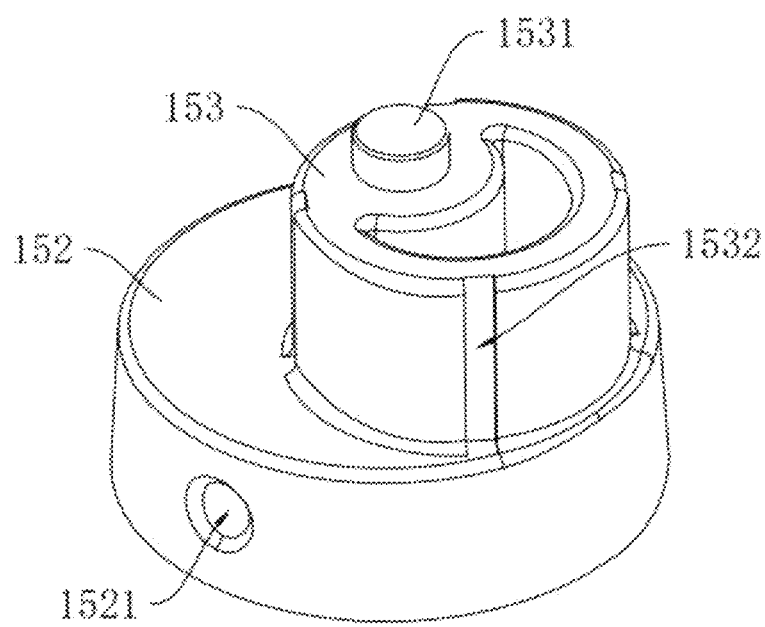
FIG. 3 shows a perspective structural schematic view of a seat body and a cam according to an embodiment of the present disclosure.

In some embodiments, referring to FIG. 1 to FIG. 3, the driving assembly 150 further includes a fixing element 155; the seat body 152 is provided with a fixing hole 1521 and a connecting hole respectively, the fixing hole 1521 communicating with the connecting hole; the output end 1511 is disposed in the connecting hole; the fixing element 155 is fixed in the fixing hole 1521, and an end of the fixing element 155 abuts against the output end 1511 of the driving member 151.

The seat body 152 can be fixedly connected to the output end 1511 of the driving member 151 through the fixing element 155, so that the output end 1511 of the driving member 151 can drive the seat body 152 to rotate, and further drive the cam 153 to rotate in the connecting rod 154.

In some embodiments, an extension direction of the fixing hole 1521 is perpendicular to an extension direction of the connecting hole.

In some embodiments, referring to FIG. 1, the output end 1511 is provided thereon with an abutment surface 1511a, and an end of the fixing element 155 abuts against the abutment surface 1511a, so that the fixing element 155 is connected to the output end 1511.

Further, the abutment surface 1511a is a plane matching an end surface of the output end 1511.

Illustratively, the driving member 151 is a motor, and the output end 1511 is a transmission shaft of the motor.

In some embodiments, the driving assembly 150 further includes a blocking element (not shown in the drawings), wherein the blocking element blocks and is fixed at an opening of the fixing hole 1521, and an end of the fixing element 155 away from the output end 1511 abuts against the blocking element.

The fixing element 155 is fixed in the fixing hole 1521, and the fixing element 155 has one end abutting against the blocking element and the other end abutting against the output end 1511, so that the output end 1511 can be ensured to drive the seat body 152 to rotate.

In another embodiment, an outer surface of the fixing element 155 is provided with an external thread, and an inner wall of the fixing hole 1521 is provided with an internal thread corresponding to the external thread; and the fixing element 155 is in threaded fit with the inner wall of the fixing hole 1521, so that the fixing element 155 is fixed in the fixing hole 1521.

In some embodiments, referring to FIG. 1 to FIG. 3, the protrusion 1531 is fixed to an end of the cam 153 away from the seat body 152, by means of integral forming.

In some embodiments, the protrusion 1531 is cylindrical in shape and the sliding groove 1541 is a waist-shaped groove, so that the protrusion 1531 is in sliding fit with the inner wall of the sliding groove 1541.

In some embodiments, an axis of the output end 1511 and an axis of the protrusion 1531 are co-linearly arranged.

Figure 4:
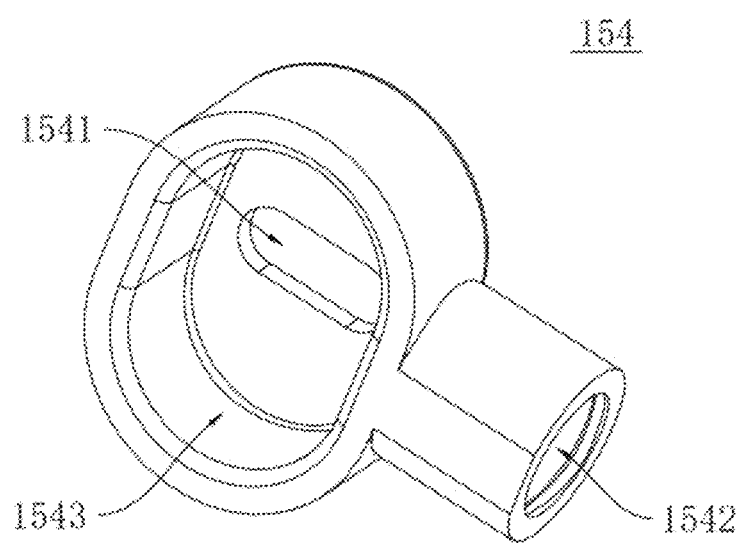
FIG. 4 shows a perspective structural schematic view of a connecting rod according to an embodiment of the present disclosure.

In some embodiments, referring to FIG. 3 and FIG. 4, the connecting rod 154 is provided with a second chamber 1543, wherein the second chamber 1543 communicates with the sliding groove 1541, and the cam 153 is rotatably provided in the second chamber 1543.

When rotating in the second chamber 1543, the cam 153 can cooperate with an inner wall of the second chamber 1543, so as to drive the connecting rod 154 to make the reciprocating motion.

The output end 1511 of the driving member 151 has a first operating state of rotating in a first direction and a second operating state of rotating in a second direction, the first direction being opposite to the second direction.

Illustratively, the first direction is a clockwise direction and the second direction is a counterclockwise direction. The driving member 151 can alternately rotate in the first direction and the second direction so as to enable the connecting rod 154 to make the reciprocating motion, and further the piston 130 to make the reciprocating motion in the movable cavity.

In some embodiments, referring to FIG. 3, at least one functional groove 1532 is provided on an outer circumferential surface of the cam 153, wherein the functional groove 1532 is used for storing lubricant oil.

Figure 5:
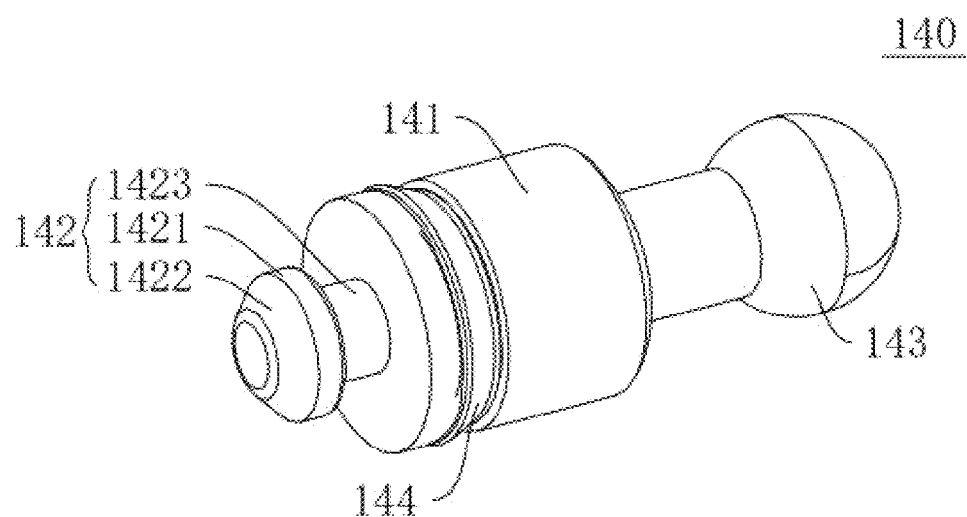
FIG. 5 is a perspective structural schematic view of a connecting member according to an embodiment of the present disclosure.

In some embodiments, referring to FIG. 1 and FIG. 5, the connecting member 140 includes a body 141, a first connecting end 142 and a second connecting end 143, wherein the first connecting end 142 is connected to an end of the body 141, and the second connecting end 143 is connected to an end of the body 141 away from the first connecting end 142. The first connecting end 142 is connected to the piston 130, and the second connecting end 143 is connected to the connecting rod 154.

In some embodiments, referring to FIG. 4 and FIG. 5, the connecting rod 154 is further provided with a first chamber 1542, and the second connecting end 143 is engaged in the first chamber 1542, so that the connecting member 140 is connected to the connecting rod 154.

Illustratively, the second connecting end 143 is substantially spherical in shape, and the first chamber 1542 is a spherical chamber matching the second connecting end 143 in the shape.

Figure 6:
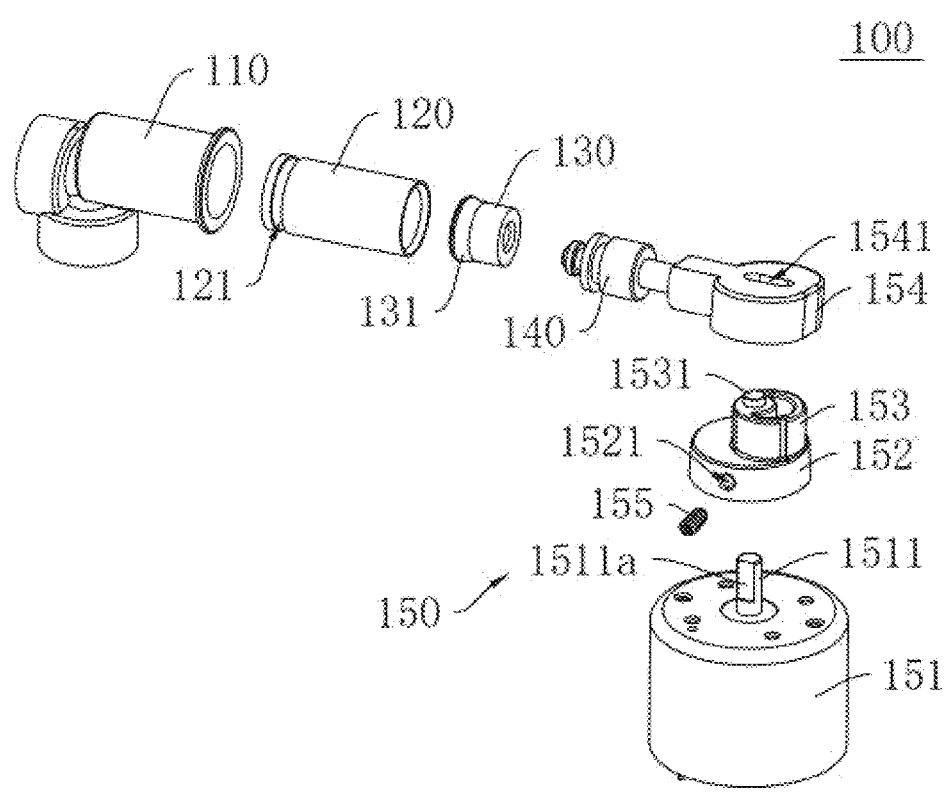
FIG. 6 shows a perspective structural schematic view of the water pump structure according to another embodiment of the present disclosure.

In some embodiments, referring to FIG. 6, the connecting rod 154 and the second connecting end 143 are fixedly connected by means of integral forming, so as to improve transmission efficiency.

Referring to FIG. 1 and FIG. 5, the piston 130 is provided with a connecting cavity, wherein an end of the connecting cavity has an opening, and the first connecting end 142 enters the connecting cavity through the opening and is disposed in the connecting cavity, so that the connecting member 140 can drive the piston 130 to move.

In some embodiments, the first connecting end 142 includes a first connecting portion 1421 and a second connecting portion 1422 connected to each other, wherein an end of the first connecting portion 1421 away from the second connecting portion 1422 is connected to the body 141.

In some embodiments, an outer diameter of at least a part of the second connecting portion 1422 is smaller than an inner diameter of the opening, so as to facilitate the first connecting end 142 entering the connecting cavity through the opening.

Further, the outer diameter of the second connecting portion 1422 is gradually increased from one end of the second connecting portion 1422 away from the first connecting portion 1421 to the other end.

Further, an outer diameter of the first connecting portion 1421 is larger than the inner diameter of the opening, so that after the first connecting end 142 is disposed in the connecting cavity, the first connecting portion 1421 is not easy to accidentally slip out through the opening. Moreover, the first connecting portion 1421 is in interference fit with the inner wall of the connecting cavity, so that the first connecting end 142 drives the piston 130 to move.

In some embodiments, the first connecting end 142 further includes a third connecting portion 1423, and the body 141 is connected to the first connecting portion 1421 through the third connecting portion 1423.

In some embodiments, the water pump structure 100 further includes a sealing element 144, the body 141 is provided with a sealing groove, and the sealing element 144 is provided in the sealing groove. The sealing element 144 is in sliding fit with the inner wall of the movable cavity and can prevent a liquid in the movable cavity from leaking.

In some embodiments, the sleeve 120 has one end fixed in the pump body 110, and the other end exposed outside the pump body 110, so as to facilitate replacement and maintenance of the sleeve 120.

Further, a fixing groove 121 is provided on an outer surface of one end of the sleeve 120, the pump body 110 is provided therein with a fixing block matching the fixing groove 121, and the fixing block is engaged in the fixing groove 121, so that one end of the sleeve 120 is fixed in the pump body 110.

In some embodiments, referring to FIG. 1, the piston 130 is provided thereon with a protruded portion 131, wherein the protruded portion 131 protrudes from an outer surface of the piston 130.

In a natural state, an outer diameter of the protruded portion 131 is larger than an inner diameter of the movable cavity, and the protruded portion 131 is in sliding fit with the inner wall of the movable cavity.

Illustratively, the piston 130 is a rubber plug.

Second Embodiment

The present disclosure further provides an oral irrigator, including the water pump structure 100 of any of the above embodiments.

The oral irrigator provided in the present embodiment has the water pump structure 100 provided in any of the above embodiments, and thus has all the beneficial effects of the water pump structure 100 provided in any of the above embodiments, which are not repeated herein.

In the description of the present specification, description with reference to the terms such as "an embodiment", "some embodiments", "example", "specific example", or "some examples" mean that specific features, structures, materials or characteristics described in combination with this embodiment or example are included in at least one embodiment or example of the present disclosure. In the present specification, schematic expressions of the above terms do not necessarily refer to the same embodiment or example. Moreover, the specific features, structures, materials or characteristics described can be combined in any suitable manner in any one or more embodiments or examples. Besides, those skilled in the art could incorporate and combine different embodiments or examples and features in different embodiments or examples described in the present specification, without contradicting each other.

Although the embodiments of the present disclosure are shown and described in the above, it could be understood that the above embodiments are illustrative, and should not be construed as limitation to the present disclosure. Those ordinarily skilled in the art could change, modify, substitute and vary the above embodiments within the scope of the present disclosure.

What is claimed is:

1. A water pump structure, comprising:
a pump body;
a sleeve, wherein at least a part of the sleeve is provided in the pump body, and the sleeve has a movable cavity therein;
a piston assembly, wherein the piston assembly comprises a piston and a connecting member, an end of the connecting member is connected to the piston, and the piston is provided in the movable cavity and is in sliding fit with an inner wall of the movable cavity; and
a driving assembly, wherein the driving assembly comprises a seat body, a cam, a connecting rod and a driving member, wherein an end of the cam is fixed on the seat body, and the cam is rotatably provided in the connecting rod; the connecting rod is provided with a sliding groove, an end of the cam away from the seat body is provided with a protrusion which is in sliding fit with an inner wall of the sliding groove; the connecting rod is connected to an end of the connecting member away from the piston; an output end of the driving member is provided to pass through the seat body and is fixedly connected to the seat body, and
an opening direction of the sliding groove is same as a moving direction of the piston in the movable cavity, wherein when the output end drives the seat body to rotate, the cam rotating in the connecting rod can drive the connecting rod to make reciprocating motion.

2. The water pump structure according to claim 1, wherein the driving assembly further comprises a fixing element; the seat body is provided with a fixing hole and a connecting hole respectively, the fixing hole communicating with the connecting hole; the output end is disposed in the connecting hole; and the fixing element is fixed in the fixing hole, and an end of the fixing element abuts against the output end.

3. The water pump structure according to claim 2, wherein the output end is provided with an abutment surface, and the end of the fixing element abuts against the abutment surface.

4. The water pump structure according to claim 3, wherein the connecting member has a first connecting end and a second connecting end opposite to each other, the first connecting end is connected to the piston, and the second connecting end is connected to the connecting rod.

5. The water pump structure according to claim 3, wherein an axis of the output end and an axis of the protrusion are co-linearly arranged.

6. The water pump structure according to claim 2, wherein the driving assembly further comprises a blocking element, the blocking element blocks an opening of the fixing hole, and an end of the fixing element away from the output end abuts against the blocking element.

7. The water pump structure according to claim 6, wherein the connecting member has a first connecting end and a second connecting end opposite to each other, the first connecting end is connected to the piston, and the second connecting end is connected to the connecting rod.

8. The water pump structure according to claim 6, wherein an axis of the output end and an axis of the protrusion are co-linearly arranged.

9. The water pump structure according to claim 2, wherein an outer surface of the fixing element is provided with an external thread, and an inner wall of the fixing hole is provided with an internal thread corresponding to the external thread; and the fixing element is in threaded fit with the inner wall of the fixing hole.

10. The water pump structure according to claim 9, wherein the connecting member has a first connecting end and a second connecting end opposite to each other, the first connecting end is connected to the piston, and the second connecting end is connected to the connecting rod.

11. The water pump structure according to claim 9, wherein an axis of the output end and an axis of the protrusion are co-linearly arranged.

12. The water pump structure according to claim 2, wherein the connecting member has a first connecting end and a second connecting end opposite to each other, the first connecting end is connected to the piston, and the second connecting end is connected to the connecting rod.

13. The water pump structure according to claim 2, wherein an axis of the output end and an axis of the protrusion are co-linearly arranged.

14. The water pump structure according to claim 1, wherein the connecting member has a first connecting end and a second connecting end opposite to each other, the first connecting end is connected to the piston, and the second connecting end is connected to the connecting rod.

15. The water pump structure according to claim 14, wherein the second connecting end and the connecting rod are integrally formed.

16. The water pump structure according to claim 14, wherein the connecting rod is provided with a first chamber, and the second connecting end is engaged in the first chamber.

17. The water pump structure according to claim 1, wherein an axis of the output end and an axis of the protrusion are co-linearly arranged.

18. An oral irrigator, comprising the water pump structure according to claim 1.

* * * * *